US005472675A

United States Patent [19]

Polizzotti et al.

[11] Patent Number: 5,472,675
[45] Date of Patent: Dec. 5, 1995

[54] POLYVINYL ALCOHOL AGGLOMERATION AGENTS FOR MINERAL BEARINGS ORES

[75] Inventors: David M. Polizzotti, North Yardley, Pa.; Donald C. Roe, Burlington, N.J.

[73] Assignee: Betz Laboratories, Inc., Trevose, Pa.

[21] Appl. No.: 301,379

[22] Filed: Sep. 6, 1994

[51] Int. Cl.[6] ............... C22B 11/00; C22B 15/00; C22B 1/00; C22B 3/00
[52] U.S. Cl. ................ 423/1; 423/27; 423/29; 75/772
[58] Field of Search .............. 75/772; 423/29, 423/1, 27

[56] References Cited

U.S. PATENT DOCUMENTS

| | | | |
|---|---|---|---|
| 3,860,414 | 1/1975 | Lang et al. | 75/772 |
| 4,208,370 | 6/1980 | Haberli et al. | 75/772 |
| 4,256,706 | 3/1981 | Heinen et al. | 423/29 |
| 4,875,935 | 10/1989 | Gross et al. | 75/117 |
| 4,898,611 | 2/1990 | Gross | 75/3 |
| 5,007,022 | 12/1991 | Polizzotti | 423/29 |
| 5,077,021 | 12/1991 | Polizzotti | 423/27 |
| 5,100,631 | 3/1992 | Gross | 423/29 |
| 5,112,582 | 5/1992 | Polizzotti | 423/27 |
| 5,186,915 | 2/1993 | Polizzotti | 423/29 |
| 5,194,174 | 3/1993 | Roe et al. | 252/173 |

Primary Examiner—Steven Bos
Attorney, Agent, or Firm—Alexander D. Ricci; Steven D. Boyd

[57] ABSTRACT

An agglomerating agent for use in the heap leaching of mineral bearing ores is disclosed. The agglomerating agent is a polyvinyl alcohol of moderate to high molecular weight which is partially or fully hydrolyzed. The polyvinyl alcohol agglomerating agent can be used alone or in combination with cement or lime in acidic or alkaline heap leaching operations.

7 Claims, No Drawings

POLYVINYL ALCOHOL AGGLOMERATION AGENTS FOR MINERAL BEARINGS ORES

FIELD OF THE INVENTION

The present invention relates to agglomerating agents applied to mineral bearing ores to be subjected to leaching recovery operations. The agglomerating agents of the present invention aid in the agglomeration of mineral bearing ore containing fines to allow effective heap leaching for mineral recovery.

BACKGROUND OF THE INVENTION

In recent years, the use of chemical leaching to recover minerals from low grade mineral bearing ores has grown. For example, caustic cyanide leaching is used to recover gold from low grade ores having about 0.02 ounces of gold per ton and dilute sulfuric acid is used to recover copper from copper bearing ores. Such leaching operations are typically carried out in large heaps. The mineral bearing ore from an open pit mine, or other source, is crushed to produce an aggregate that is coarse enough to be permeable in heaps but fine enough to expose the mineral values to the leaching solution. After crushing, the ore is formed into heaps on impervious leach pads. The leaching solution is evenly distributed over the top of the heaps by sprinklers, wobblers, or other similar equipment. As the barren leaching solution percolates through the heap, it dissolves the minerals contained in the ore. The liquor collected by the impervious leach pad at the bottom of the heap is recovered and this "pregnant solution" is subjected to a mineral recovery operation. The leachate from the recovery operation is held in a barren pond for reuse.

Economical operation of such heap leaching operations requires that the heaps of crushed ore have good permeability after being crushed and stacked so as to provide good contact between the ore and the leachate. Ores containing excessive quantities of clay and/or fines (i.e., 30% by weight of −100 mesh fines) have been found undesirable due to their tendency to slow the percolation flow of leach solution. Slowing of the percolation flow of the leach solution can occur when clay and/or fines concentrate in the center of the heap while large rock fragments tend to settle on the lower slopes and base of the heap. This segregation is aggravated when the heap is leveled off for installation of the sprinkler system that delivers the leach solution. This segregation results in localized areas or zones within the heap with marked difference in permeability. The result is channeling where leach solution follows the course of least resistance, percolating downward through the course ore regions and bypassing or barely wetting areas that contain large amounts of clay and/or fines. Such channeling produces dormant or unleached areas within the heap. The formation of a "slime mud" by such fines can be so severe as to seal the heap causing the leach solution to run off the sides rather than to percolate. This can require mechanical reforming of the heap. The cost of reforming the heaps which can cover 160 acres and be 200 feet high negates the economies of scale that make such mining commercially viable.

In the mid 1970s, the United States Bureau of Mines determined that ore bodies containing high percentages of clay and/or fines could be heap leached if the fines in the ore could be agglomerated. The Bureau of Mines developed an agglomeration process in which crushed ore is mixed with portland cement at the rate of from 10 to 20 pounds per ton, wetted with 16 to 18% moisture (as water or leach solution), agglomerated by a disk pelletizer and cured for a minimum of eight hours before being subjected to stacking in heaps for the leaching operation.

In commercial practice, the method developed by the United States Bureau of Mines has not met with widespread acceptance because of the cost and time required. However, the use of cement, as well as other materials, as agglomerating agents is known. Agglomerating practices tend to be site specific and non-uniform. Typically, the action of the conveyors which move the ore from the crusher to the ore heaps or the tumbling of ore down the conical piles is relied on to provide agglomeration for a moistened cement-ore mixture. Lime has been found to be less effective than cement in controlling clay fines, it is believed this is because the lime must first attack the clay lattice structure in order to provide binding.

Cement has been found to be most effective in high siliceous ores (crushed rock) and noticeably less effective in ores having a high clay content. The large volumes of cement required also present problems. The transportation to and storage of large volumes of dusty cement at the often remote mine locations is difficult. With the growth of such mining methods, the need for cost effective, efficient agglomerating materials has grown.

U.S. Pat. Nos. 5,077,021 and 5,077,022 disclose agglomerating agents and methods for use in heap leaching which comprise anionic polymers of acrylamide and acrylic acid.

U.S. Pat. No. 4,875,935 discloses a method for extracting copper from copper minerals which employs an agglomerating agent comprising anionic acrylamide polymers containing at least five mole percent of carboxylate or sulfonate groups. U.S. Pat. Nos. 4,898,611 and 5,100,631 disclose improvements in the agglomeration of a gold or silver ore with cement comprising including specific water soluble vinyl polymers in the cement agglomeration treatment.

U.S. Pat. Nos. 5,112,582 and 5,186,915 disclose agglomerating agents and methods for using heap leaching of mineral bearing ores which comprises an anionic polymer of acrylamide and acrylic acid and sufficient lime to provide a pH of from about 9.5 to 11.

SUMMARY OF THE INVENTION

The present invention is directed toward new and improved agglomerating agents for use in heap leaching of mineral bearing ores. More specifically, the present invention is directed toward a new agglomerating agent comprising polyvinyl alcohol of moderate to high molecular weight. The polyvinyl alcohol can be crosslinked and may be used in combination with cement or lime. The agglomerating agent of the present invention may be employed in acidic or alkaline leaching operations. Preferably, the agglomerated agent of the present invention is a high molecular weight, partially or fully hydrolyzed polyvinyl alcohol. It was discovered that such polyvinyl alcohols alone or in combination with cement or lime are effective agglomerating agents in acidic or alkaline heap leaching operations.

The effectiveness of the agglomerating agents of the present invention was determined in submersion/dispersion testing at low pH (pH 2.0) and high pH (pH 10.7). The submersion/dispersion test measures the weight of fines washed from an agglomerate after a three minute submersion period. The water used in the tests was pH adjusted using sulfuric acid (pH 2.0) and lime (pH 10.7) for the acidic and alkaline tests respectively. The samples to be tested were agglomerated in a laboratory drum type agglomerator.

DETAILED DESCRIPTION OF THE PREFERRED EMBODIMENTS

The present invention provides a new agglomerating agent for use in heap leaching of mineral bearing ores. It has been discovered that high molecular weight, hydrolyzed polyvinyl alcohols with and without crosslinking, are effective agglomerating agents under both acidic and alkaline conditions. The polyvinyl alcohols can be used in combination with known agglomerating agents such as cement or with pH control agents such as lime.

To allow comparison of the efficiency of the agglomerating agents of the present invention when applied to different ores, standardized testing procedures were developed. These procedures allow the efficiency of the various agglomerating agents to be compared. The standardized procedures begin with preparation of the ore to be tested. As received gold bearing ore was air dried and sieved to two size factors: ½ inch by ¼ inch, and $^-$16 mesh. Test samples totaling 500 grams were prepared by combining 350 grams of the ½ by ¼ inch material with 150 grams of the $^-$16 mesh material. As received copper ore was air dried and sieved to $^-$½ inch. The $^-$½ inch material was riffled into 500 gram test samples.

The 500 gram test samples were agglomerated in a laboratory drum type agglomerator. 10% moisture addition was used in agglomerating the gold bearing ore, 15% moisture addition was used in agglomerating the copper bearing ore. Testing was conducted under both acidic and alkaline conditions. Acidic conditions were obtained by making down the treatments in water adjusted to a pH of 2.0 with sulfuric acid. Alkaline conditions were obtained by making down the treatments in water adjusted to a pH of 10.7 with lime. Under alkaline conditions, lime or cement was added to the mineral bearing ore to provide alkalinity. The treatment solutions were added to the dry mineral bearing ore with a syringe pump as it was rotating in the drum. The drum agglomerator was equipped with two injection ports to facilitate adding the treatment and a crosslinking agent simultaneously but separately. Total agglomeration time was five minutes.

After agglomeration, the mineral bearing ore was dried on a 10 mesh sieve for 24 hours at 20° C. and 50% relative humidity. After drying, the samples were subjected to submersion/dispersion testing. The submersion/dispersion testing measures the weight of fines washed from the agglomerates after a 3 minute submersion. The water used for submersion was pH adjusted, using sulfuric acid (pH 2.0) and lime (pH 10.7) for the acidic and alkaline tests respectively.

The preferred agglomeration agent of the present invention comprises a polyvinyl alcohol, of high molecular weight, which is fully or super hydrolyzed. The polyvinyl alcohol may be crosslinked with conventional crosslinking agents such as boric acid, gallic acid, and glyoxal. The molecular weight of a high molecular weight polyvinyl alcohol can range from about 50,000 to 150,000 and is preferably about 100,000. Fully or super hydrolyzed material are those being 98 to 99$^+$% hydrolyzed. The polyvinyl alcohol of the present invention is about 90 to 99$^+$% hydrolyzed, preferably above about 98% hydrolyzed.

In practice, bench scale testing will allow selection of the most effective combination of polyvinyl alcohol, crosslinker and cement or lime. Such testing is preferred because it was discovered that efficiency was somewhat influenced by the composition of the ore to be treated. Typical treatment rates for polyvinyl alcohol range from about 0.025 to about 0.25, preferably about 0.1 pounds active per ton of ore. Typical treatment rates for the crosslinking agent, when employed, range from about 0.001 to 0.025, preferably about 0.005 pounds active per ton of ore. The cement or lime can be added at treatment rates of from about 1 to 20 pounds per ton of ore.

Testing of a variety of commercially available polyvinyl alcohols, polyethylene oxides, cationic polymers, and a commercial anionic polymer agglomerating agent in accordance with U.S. Pat. Nos. 5,077,021 and 5,077,022 was undertaken. Table I summarizes the treatments tested.

TABLE I

| Treatment | Trade Name | Description |
|---|---|---|
| A | Airvol 107 | Polyvinyl alcohol, low M.W., fully hydrolyzed |
| B | Airvol 165 | Polyvinyl alcohol, high M.W., super hydrolyzed |
| C | Airvol 205 | Polyvinyl alcohol, low M.W., partially hydrolyzed |
| D | Airvol 350 | Polyvinyl alcohol, high M.W., fully hydrolyzed |
| E | Vinol 540 | Polyvinyl alcohol, high M.W., partially hydrolyzed |
| F | Polyox WSR-N-10 | Polyethylene oxide, low M.W. (~100,000) |
| G | Polyox WSR-N-205 | Polyethylene oxide, high M.W. (~600,000) |
| H | Polyox WSR-N-205 | Polyethylene oxide, medium M.W. (~300,000) |
| I | FlowPro 1512 | Sodium lignosulfonate |
| J | FlowPro 9120 | Anionic polymer (AA/AM) |
| K | Betz Polymer 1175 | Cationic polymer (ADA/DETA/EPI) |
| L | Betz Polymer 2651 | Cationic polymer (DADMAC/AM) |
| M | Betz Polymer 2666 | Cationic polymer (pseudo-star, 50% cationic) |
| N | Betz Polymer 2672 | Cationic polymer (graft, 5% cationic) |
| O | Betz Polymer 2674 | Cationic polymer (graft, 10% cationic) |
| P | Betz Polymer 2676 | Cationic polymer (graft, 20% cationic) |

Tables II through IX summarize the results of the agglomeration testing. Tables II through V summarize testing of a variety of nonionic polyvinyl alcohols and polyethylene oxide polymers, an anionic copolymer emulsion and a lignosulfonate. A variety of crosslinking agents in combination with the polyvinyl alcohols were also tested.

TABLE II

Gold Ore Agglomeration with 3 lbs. cement/ton ore (pH = 10.7)

| | TREATMENTS | FEED RATES | | |
|---|---|---|---|---|
| Polymer | Cross-linking Agent | Polymer (lb. Active/Ton) | Cross-linking Agent (lb. Active/Ton) | % Agglomeration |
| B | — | 0.25 | — | 73 |
| C | — | 0.25 | — | 0 |
| D | — | 0.25 | — | 76 |
| E | — | 0.25 | — | 6 |
| F | — | 0.25 | — | 0 |
| G | — | 0.25 | — | 0 |
| H | — | 0.25 | — | 0 |
| I | — | 0.25 | — | 0 |
| J | — | 0.25 | — | 96 |
| E | Boric Acid | 0.25 | 0.025 | 79 |
| E | Gallic Acid | 0.25 | 0.025 | 69 |
| H | FlowPro 1512 | 0.25 | 0.025 | 55 |
| H | FlowPro 1512 | 0.25 | 0.0625 | 0 |
| H | FlowPro 1512 | 0.25 | 0.125 | 4 |
| I | Sodium Dichromate | 0.25 | 0.025 | 0 |
| I | Sodium Dichromate | 0.25 | 0.0625 | 0 |

TABLE III

Gold Ore Agglomeration with 2 lbs. lime/ton ore (pH = 10.7)

| | TREATMENTS | FEED RATES | | |
|---|---|---|---|---|
| Polymer | Cross-linking Agent | Polymer (lb. Active/Ton) | Cross-linking Agent (lb. Active/Ton) | % Agglomeration |
| B | — | 0.25 | — | 63 |
| C | — | 0.25 | — | 3 |
| D | — | 0.25 | — | 70 |
| E | — | 0.25 | — | 50 |
| F | — | 0.25 | — | 2 |
| G | — | 0.25 | — | 10 |
| H | — | 0.25 | — | 5 |
| I | — | 0.25 | — | 9 |
| J | — | 0.25 | — | 96 |
| E | Boric Acid | 0.25 | 0.025 | 74 |
| E | Gallic Acid | 0.25 | 0.025 | 36 |
| H | FlowPro 1512 | 0.25 | 0.025 | 7 |
| H | FlowPro 1512 | 0.25 | 0.0625 | 14 |
| H | FlowPro 1512 | 0.25 | 0.125 | 13 |
| I | Sodium Dichromate | 0.25 | 0.025 | 9 |
| I | Sodium Dichromate | 0.25 | 0.0625 | 11 |

TABLE IV

Gold Ore Agglomeration at pH = 2.0

| | TREATMENTS | FEED RATES | | |
|---|---|---|---|---|
| Polymer | Cross-linking Agent | Polymer (lb. Active/Ton) | Cross-linking Agent (lb. Active/Ton) | % Agglomeration |
| B | — | 0.25 | — | 72 |
| C | — | 0.25 | — | 11 |
| D | — | 0.25 | — | 75 |
| E | — | 0.25 | — | 56 |
| F | — | 0.25 | — | 0 |
| G | — | 0.25 | — | 16 |
| H | — | 0.25 | — | 18 |
| I | — | 0.25 | — | 12 |
| J | — | 0.25 | — | 17 |
| E | Boric Acid | 0.25 | 0.025 | 28 |
| E | Gallic Acid | 0.25 | 0.025 | 4 |
| H | FlowPro 1512 | 0.25 | 0.025 | 17 |
| H | FlowPro 1512 | 0.25 | 0.0625 | 14 |
| H | FlowPro 1512 | 0.25 | 0.125 | 16 |
| I | Sodium Dichromate | 0.25 | 0.025 | 20 |
| I | Sodium Dichromate | 0.25 | 0.0625 | 23 |

TABLE V

Copper Ore Agglomeration at pH = 2.0

| | TREATMENTS | FEED RATES | | |
|---|---|---|---|---|
| Polymer | Cross-linking Agent | Polymer (lb. Active/Ton) | Cross-linking Agent (lb. Active/Ton) | % Agglomeration |
| B | — | 0.25 | — | 21 |
| C | — | 0.25 | — | 11 |
| D | — | 0.25 | — | 24 |
| E | — | 0.25 | — | 26 |
| F | — | 0.25 | — | 0 |
| G | — | 0.25 | — | 24 |
| H | — | 0.25 | — | 12 |
| I | — | 0.25 | — | 15 |
| J | — | 0.25 | — | 18 |
| E | Boric Acid | 0.25 | 0.025 | 0 |
| E | Gallic Acid | 0.25 | 0.025 | 22 |
| H | FlowPro 1512 | 0.25 | 0.025 | 9 |
| H | FlowPro 1512 | 0.25 | 0.0625 | 17 |
| H | FlowPro 1512 | 0.25 | 0.125 | 11 |
| I | Sodium Dichromate | 0.25 | 0.025 | 8 |
| I | Sodium Dichromate | 0.25 | 0.0625 | 28 |

Tables VI through IX summarize the results of testing of a variety of cationic polymers and the most effective treatments from Tables II through V. Alternative polyvinyl alcohol and crosslinking agent chemistries were also tested.

TABLE VI

Gold Ore Agglomeration with 3 lbs. cement/ton ore (pH = 10.7)

| | TREATMENTS | FEED RATES | | |
|---|---|---|---|---|
| Polymer | Cross-linking Agent | Polymer (lb. Active/Ton) | Cross-linking Agent (lb. Active/Ton) | % Agglomeration |
| A | — | 0.25 | — | 0 |
| D | — | 0.25 | — | 74 |

TABLE VI-continued

Gold Ore Agglomeration with 3 lbs. cement/ton ore (pH = 10.7)

| TREATMENTS | | FEED RATES | | |
|---|---|---|---|---|
| Polymer | Cross-linking Agent | Polymer (lb. Active/Ton) | Cross-linking Agent (lb. Active/Ton) | % Agglomeration |
| L | — | 0.25 | — | 76 |
| M | — | 0.25 | — | 42 |
| N | — | 0.25 | — | 87 |
| O | — | 0.25 | — | 87 |
| P | — | 0.25 | — | 80 |
| K | — | 0.25 | — | 0 |
| J | — | 0.25 | — | 94 |
| A | Boric Acid | 0.25 | 0.025 | 0 |
| D | Boric Acid | 0.25 | 0.025 | 63 |
| A | Glyoxal | 0.25 | 0.025 | 0 |
| D | Glyoxal | 0.25 | 0.025 | 63 |

TABLE VII

Gold Ore Agglomeration with 2.0 lbs. lime/ton ore (pH = 10.7)

| TREATMENTS | | FEED RATES | | |
|---|---|---|---|---|
| Polymer | Cross-linking Agent | Polymer (lb. Active/Ton) | Cross-linking Agent (lb. Active/Ton) | % Agglomeration |
| A | — | 0.25 | — | 0 |
| D | — | 0.25 | — | 66 |
| L | — | 0.25 | — | 94 |
| M | — | 0.25 | — | 31 |
| N | — | 0.25 | — | 93 |
| O | — | 0.25 | — | 88 |
| P | — | 0.25 | — | 82 |
| K | — | 0.25 | — | 0 |
| J | — | 0.25 | — | 94 |
| A | Boric Acid | 0.25 | 0.025 | 0 |
| D | Boric Acid | 0.25 | 0.025 | 72 |
| A | Glyoxal | 0.25 | 0.025 | 0 |
| D | Glyoxal | 0.25 | 0.025 | 61 |

TABLE VIII

Gold Ore Agglomeration at pH = 2.0

| TREATMENTS | | FEED RATES | | |
|---|---|---|---|---|
| Polymer | Cross-linking Agent | Polymer (lb. Active/Ton) | Cross-linking Agent (lb. Active/Ton) | % Agglomeration |
| A | — | 0.25 | — | 0 |
| D | — | 0.25 | — | 85 |
| L | — | 0.25 | — | 67 |
| M | — | 0.25 | — | 88 |
| N | — | 0.25 | — | 76 |
| O | — | 0.25 | — | 69 |
| P | — | 0.25 | — | 80 |
| K | — | 0.25 | — | 0 |
| J | — | 0.25 | — | 0 |
| A | Boric Acid | 0.25 | 0.025 | 0 |
| D | Boric Acid | 0.25 | 0.025 | 48 |
| A | Glyoxal | 0.25 | 0.025 | 0 |
| D | Glyoxal | 0.25 | 0.025 | 60 |

TABLE IX

Copper Ore Agglomeration at pH = 2.0

| TREATMENTS | | FEED RATES | | |
|---|---|---|---|---|
| Polymer | Cross-Linking Agent | Polymer (lb. Active/Ton) | Cross-linking Agent (lb. Active/Ton) | % Agglomeration |
| A | — | 1 | — | 0 |
| D | — | 1 | — | 0 |
| L | — | 1 | — | 77 |
| M | — | 1 | — | 86 |
| N | — | 1 | — | 82 |
| O | — | 1 | — | 71 |
| P | — | 1 | — | 88 |
| K | — | 1 | — | 0 |
| J | — | 1 | — | 20 |
| A | Boric Acid | 1 | 0.1 | 0 |
| D | Boric Acid | 1 | 0.1 | 27 |
| A | Glyoxal | 1 | 0.1 | 0 |
| D | Glyoxal | 1 | 0.1 | 29 |

Tables II and III show that Treatment J and the high molecular weight polyvinyl alcohols (Treatments B,D,E) were the best agglomerating agents for gold ore under alkaline conditions. The most efficacious polyvinyl alcohols were fully hydrolyzed (Treatment D). Also crosslinking Treatment E with boric acid improved performance.

Table IV shows that the most effective agglomerating agents for gold ore under acidic conditions were high molecular weight, polyvinyl alcohol polymers. The commercial acrylic acid/acrylamide anionic emulsion polymer (Treatment J) did not appear to invert at this pH and therefore was ineffective.

The data in Table V is somewhat inconclusive, it is believed that the treatment rate was insufficient to agglomerate the copper ore due to the large amount of fines present in the ore sample.

In Table IX, polymer feed rates were increased to one pound active per ton of ore. Under these conditions, the agglomeration of low pH copper ore, the tested cationic polymers were the most effective. However, the fully hydrolyzed, high molecular weight, polyvinyl alcohol showed improved performance when crosslinked.

While the present invention has been described with respect to particular embodiments thereof, it is apparent that other forms and modifications of the invention will be obvious to those skilled in the art. The appended claims and this invention generally should be construed to cover all such obvious forms and modifications which are within the true spirit and scope of the present invention.

We claim:

1. In a process for percolation leaching of minerals from a mineral bearing ore wherein the ore is first agglomerated with an agglomerating agent, formed into a heap and then leached by percolating a leaching solution through the heap which extracts the minerals from the agglomerated ore for subsequent recovery, the improvement in which said agglomerating agent comprises an about 90 to 99+% hydrolyzed nonionic polyvinyl alcohol having a molecular weight of from about 50,000 to about 150,000.

2. The process of claim 1 wherein said polyvinyl alcohol is crosslinked with a crosslinking agent.

3. The process of claim 2 wherein said crosslinking agent is selected from the group consisting of boric acid, gallic acid and glyoxal.

4. The process of claim 1 wherein said agglomerating agent includes 1 to 20 pounds lime per ton of mineral bearing ore.

5. The process of claim 1 wherein said agglomerating agent includes 1 to 20 pounds cement per ton of mineral bearing ore.

6. The process of claim 1 wherein said nonionic polyvinyl alcohol has a molecular weight of about 100,000.

7. The process of claim 1 wherein said nonionic polyvinyl alcohol is about 98% hydrolyzed.

* * * * *